(12) United States Patent
Acker et al.

(10) Patent No.: US 8,276,727 B2
(45) Date of Patent: Oct. 2, 2012

(54) DUAL CLUTCH

(75) Inventors: Christophe Acker, Gambsheim (FR); Sibylle Hahn, Rheinmuenster (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/031,857

(22) Filed: Feb. 22, 2011

(65) Prior Publication Data

US 2011/0139568 A1    Jun. 16, 2011

Related U.S. Application Data

(63) Continuation of application No. PCT/DE2009/001087, filed on Aug. 3, 2009.

(30) Foreign Application Priority Data

| Aug. 22, 2008 | (DE) | ............ 10 2008 039 358 |
| Dec. 18, 2008 | (DE) | ............ 10 2008 063 749 |
| Mar. 18, 2009 | (DE) | ............ 10 2009 013 443 |

(51) Int. Cl.
*F16D 25/10* (2006.01)

(52) U.S. Cl. .................. 192/48.606; 192/48.8

(58) Field of Classification Search ............. 192/48.602, 192/48.603, 48.606, 48.8, 48.608, 85.51, 192/85.52
See application file for complete search history.

(56) References Cited

U.S. PATENT DOCUMENTS

| 4,869,355 | A | * | 9/1989 | Corral et al. .................... 192/98 |
| 4,964,504 | A | * | 10/1990 | Friedmann .................... 192/48.4 |
| 2003/0066729 | A1 * | | 4/2003 | Feldhaus et al. ............. 192/48.8 |
| 2011/0139565 | A1 * | | 6/2011 | Acker ....................... 192/48.601 |
| 2011/0139571 | A1 * | | 6/2011 | Acker et al. ............... 192/85.01 |

FOREIGN PATENT DOCUMENTS

| DE | 15 05 577 A1 | 7/1970 |
| DE | 199 41 837 A1 | 2/2001 |
| EP | 0 185 176 A1 | 6/1986 |
| EP | 0 931 951 A1 | 7/1999 |
| EP | 1 413 795 A2 | 4/2004 |
| EP | 1 830 095 A1 | 9/2007 |
| FR | 2 851 627 A1 | 8/2004 |

* cited by examiner

*Primary Examiner* — Richard M. Lorence
(74) *Attorney, Agent, or Firm* — Lucas & Mercanti, LLP; Klaus P. Stoffel

(57) ABSTRACT

A dual clutch assembly which has compensating actuation forces for vehicles.

12 Claims, 8 Drawing Sheets

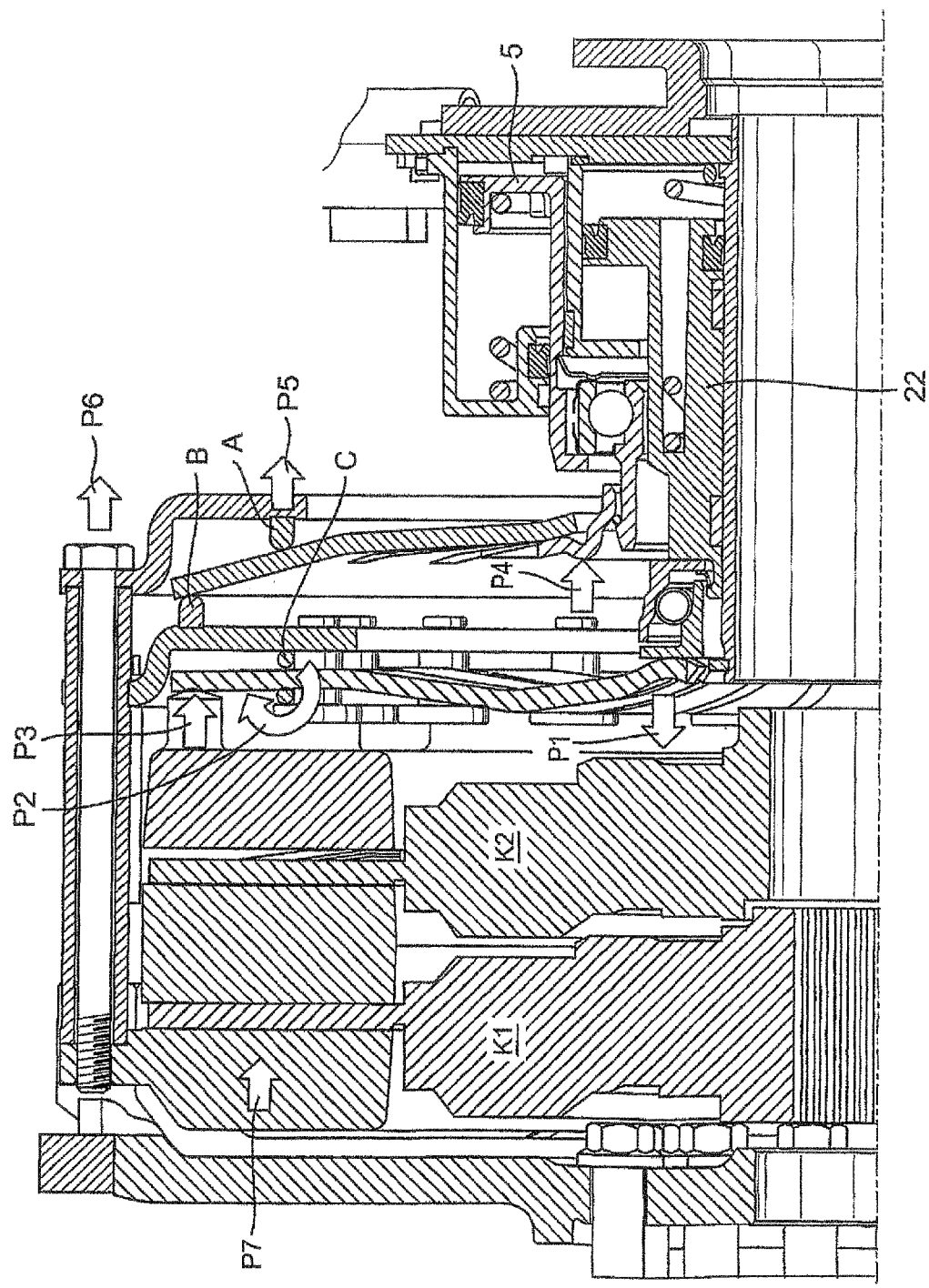

DUAL CLUTCH

This application is a continuation of PCT/EP2009/001087 filed Aug. 3, 2009, which in turn claims the priority of DE 10 2008 039 358.4 filed Aug. 22, 2008, DE 10 2008 063 749.1 filed Dec. 18, 2008, and DE 10 2009 013 443.3 filed Mar. 18, 2009, the priority of these applications is hereby claimed and these applications are incorporated by reference herein.

FIELD OF THE INVENTION

The present invention relates to a double clutch and to a double clutch transmission having a double clutch of said type.

BACKGROUND OF THE INVENTION

Double clutches such as are known for example from EP 0 185 176 B1 permit a shift between different transmission ratio stages (gears) of a transmission without an interruption in tractive force.

In the double clutch design known from EP 0 185 176 B1 which has a first component clutch K1 and a second component clutch K2 which are connected in each case to one of the two input shafts of a double clutch transmission, the two component clutches K1 and K2 are designed to be open in the basic state ("normally open") and are closed by means of a hydraulic actuating device. Here, the engine-side component clutch K1 is pulled closed by the actuating device and the transmission-side component clutch K2 is pushed closed by the actuating device. Since both component clutches K1 and K2 are open in the basic state, it is necessary, in order to transmit power from the drive to the transmission, for an actuating force to be imparted continuously by means of the actuating device to the component clutch to be held closed in each case, which must then be supported by means of the bearing arrangement of the double clutch.

In utility vehicle applications, in which a torque in the range from 3,300 to 3,500 Nm may be encountered, actuating forces in the range from 12,400 to 15,000 N occur, which must then be supported by means of a crankshaft bearing or a transmission bearing.

SUMMARY OF THE INVENTION

It is therefore an object of the present invention to specify a double clutch in which the necessary actuating forces are minimized.

Said object is achieved according to the invention by means of a double clutch having a first component clutch K1 by means of which a driveshaft of a drive can be connected to a first transmission input shaft of a transmission and having a second component clutch K2 by means of which the driveshaft of the drive can be connected to a second transmission input shaft of the transmission, and having an actuating device, wherein the first component clutch K1 is open in its non-actuated state and a tensile force is applied by the actuating device in order to close said first component clutch K1, and wherein the second component clutch K2 is closed in its non-actuated state and a pressure force is applied by the actuating device in order to open said second component clutch K2, such that the actuating force of the first component clutch K1 acts counter to the actuating force of the second component clutch K2.

Correspondingly, in the double clutch according to the invention, the sum of the necessary actuating forces of the component clutches during operation is minimized, such that a reinforced design of the bearing arrangement and all the correspondingly necessary modifications in the housing can be dispensed with. Specifically during an overlapping shift of the component clutches K1 and K2 during a gear change, this results in the action of actuating forces on the bearing arrangement of the double clutch being virtually canceled out.

In a preferred exemplary embodiment, the actuating device comprises a first pneumatically or hydraulically actuable cylinder unit, with cylinder housing and piston, for pulling an actuating bearing of one component clutch K1, and a second pneumatically or hydraulically actuable cylinder unit, with cylinder housing and piston, for pushing an actuating bearing of the other component clutch K2. Specifically in utility vehicle applications, a pneumatic system is already present in the vehicle, such that specifically the embodiment with a pneumatic actuating force is advantageous because the actuating device can be connected directly to the existing on-board compressed air network.

In a further exemplary embodiment, a flywheel disk with or without vibration damping is provided, which flywheel disk is fixedly connected to a driveshaft of a drive, with the double clutch having a central plate as a counterpressure plate for the pressure plates of the component clutches K1 and K2, with the central plate being fixed to the flywheel disk, and with the double clutch being mounted exclusively by means of the fastening of the flywheel disk to the driveshaft. Here, a flywheel disk with or without vibration damping may be understood in particular also to mean a so-called flex plate (as an example without vibration damping) or a dual-mass flywheel (as an example with vibration damping).

The pressure plates of the two component clutches K1 and K2 are preferably fixed directly to the central plate or to the housing of the double clutch by means of leaf springs, in particular in conjunction with rivet connections.

Furthermore, the clutch cover of the component clutch K2 may be fixed to the central plate.

It is preferable for the first cylinder unit, which generates a tensile force, to interact via a first actuating bearing with the component clutch K1 which is pulled closed and which is open in the normal state, and for the second cylinder unit, which generates a pressure force, to interact via the other actuating bearing with the component clutch K2 which is pushed open and which is closed in the normal state.

Here, the two cylinder units may be nested one inside the other and are in particular also arranged symmetrically with respect to an axis of the transmission input shafts and of the clutch, such that said cylinder units form an inner cylinder unit and an outer cylinder unit in relation to the axis, with the outer cylinder unit being designed as a first cylinder unit which generates a tensile force, and with the inner cylinder unit being designed as a second cylinder unit which generates a pressure force.

Furthermore, the double clutch may have a central guide tube which is supported on the transmission, with the piston of the inner cylinder unit being movably supported on the central guide tube, and with a piston of the outer cylinder unit being movably supported on the cylinder housing of the inner cylinder unit.

Furthermore, the cylinder housing of the inner cylinder unit and/or the cylinder housing of the outer cylinder unit may be fastened to a rear wall, which is supported on the central guide tube, of the actuating device.

A preload spring for the inner cylinder unit may be arranged between the rear wall and the piston of the inner cylinder unit, by means of which preload spring a piston is pushed in the direction of the associated actuating bearing of the component clutch K2, with a pressure chamber of the inner cylinder unit being formed by the piston and cylinder housing of the inner cylinder unit and by the rear wall.

Furthermore, a preload spring for the outer cylinder unit may be arranged between the cylinder housing and the piston of the outer cylinder unit, with a pressure chamber of the outer cylinder unit being formed exclusively by the cylinder housing and piston of the outer cylinder unit.

The teaching of the present invention in particular also concerns a double clutch transmission having a first and a second transmission input shaft, with a first group of transmission ratio stages being assigned to the first transmission input shaft and a second group of transmission ratio stages being assigned to the second transmission input shaft, and with it being possible for the transmission input shafts to be connected to a driveshaft of a drive by means of a double clutch according to the above teaching in that the first transmission input shaft can be connected to the driveshaft by means of the first component clutch K1 and the second transmission input shaft can be connected to the driveshaft by means of the second component clutch K2, and with that transmission ratio stage which is used most during the operation of the double clutch transmission being assigned to the second transmission input shaft and to the second component clutch K2. In particular, the highest transmission ratio stage (in a utility vehicle transmission, for example the 12th gear) may be assigned, as the transmission stage which is used most during the operation of the double clutch transmission, to the second transmission input shaft and to the second component clutch.

BRIEF DESCRIPTION OF THE DRAWINGS

The present invention will be explained in more detail below on the basis of preferred exemplary embodiments in conjunction with the associated figures, in which:

FIG. 8 shows a further illustration of the second exemplary embodiment in the worn state with the component clutch K1 closed and the component clutch K2 open (that is to say both component clutches are actuated).

DETAILED DESCRIPTION OF THE INVENTION

The present exemplary embodiments of the actuating device can be used in particular for vehicles having a compressed air system, for example utility vehicles.

Figure 1:
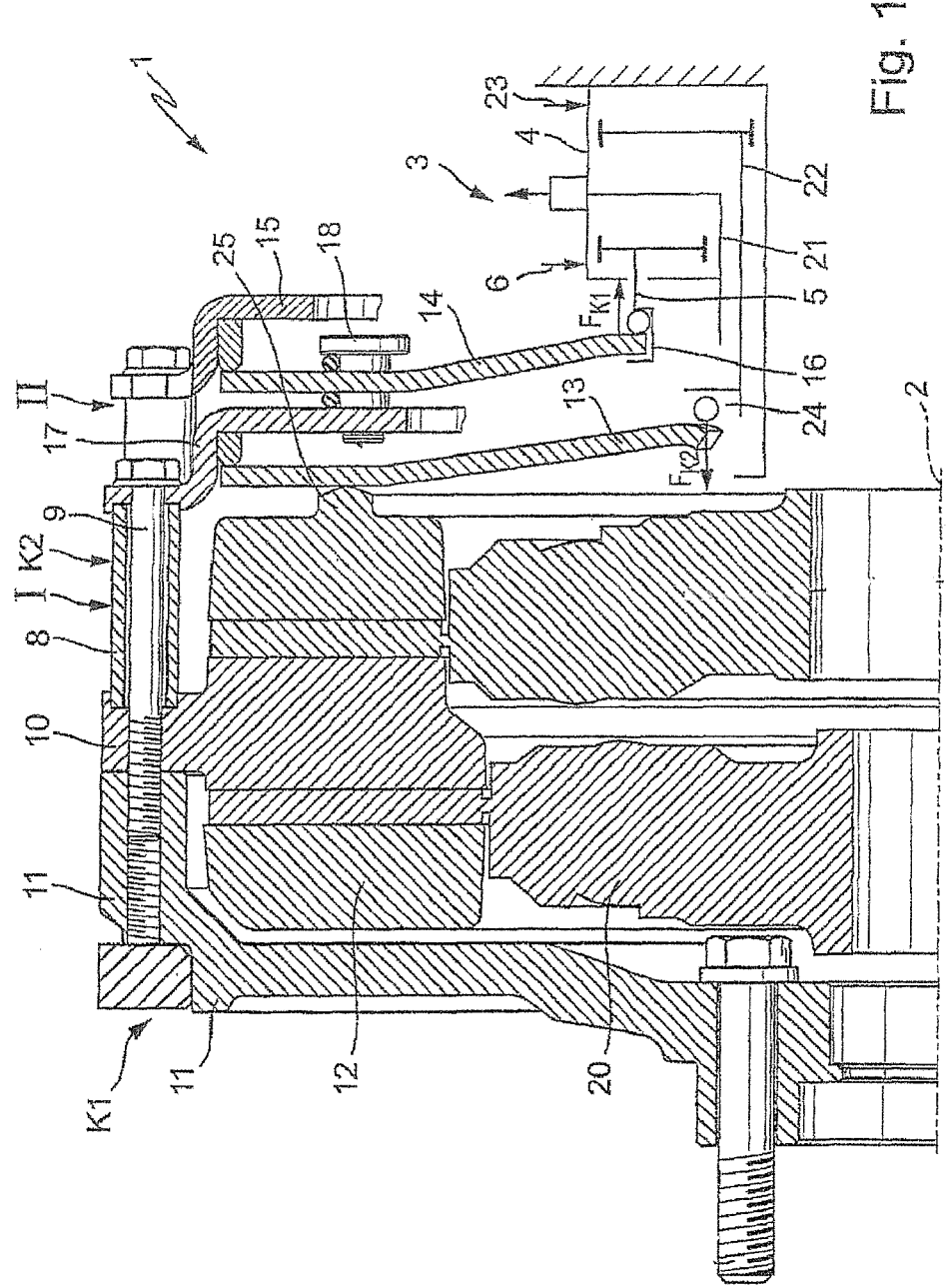
FIG. 1 shows an illustration of the first exemplary embodiment of a double clutch as a half-section having a component clutch K1, which is closed in the normal state and is pulled open, and a component clutch K2, which is open in the normal state and is pushed closed, with a schematically illustrated pneumatic actuating device.

FIG. 1 shows the design of a first exemplary embodiment of a double clutch having a pneumatically actuated central disengagement unit for both component clutches (also referred to hereinafter as "double CPCA"), which can be used in vehicles having compressed air systems. The present teaching is however not restricted to the use of a pneumatically actuated central disengagement unit. Hydraulic, hydromechanically actuated, electric, electromechanically actuated or mechanical actuating devices may also be combined with the double clutch concepts and double clutch transmission concepts disclosed.

The present double clutch is arranged in the drivetrain of a vehicle between a drive and a double clutch gearbox, with it being possible for a torsional vibration damping element such as a dual mass flywheel or a non-split centrifugal mass (flywheel) to be arranged between the drive and the double clutch.

The double clutch design 1 according to the first exemplary embodiment comprises a first component clutch K1 which is closed in the basic state ("normally closed"), with the actuating mechanism of said component clutch K1 being designed such that said first component clutch K1 is acted on with a tensile force $F_{K1}$ in order to be opened, and a second component clutch K2 which is open in the basic state ("normally open"), with the actuating mechanism of said component clutch K2 being designed such that said second component clutch K2 is acted on with a pressure force $F_{K2}$ in order to be closed. One of the two component clutches K1 and K2 may have a wear adjusting device. It is likewise possible for the two component clutches K1 and K2 to each have wear adjusting devices. It is alternatively possible (as will be explained below in conjunction with the second exemplary embodiment) for a wear reserve for the actuating travel to be integrated into the pneumatic (or hydraulic) actuating device.

The actuating forces (tensile force $F_{K1}$ of the component clutch K1 and pressure force $F_{K2}$, of the component clutch K2) are generated by an actuating device 3 which is arranged centrally with respect to an axis of rotation 2 of the double clutch 1 and which, in the present case, is pneumatically operated. Hydraulic actuation is also alternatively possible. Pneumatic actuation, however, has the advantage of the very much lower density of air, such that it is possible to dispense with the centrifugal force compensation which is possibly required with hydraulic media on account of the changing mass ratios during the actuation of the clutch.

The actuating device 3 comprises a first cylinder unit ("outer cylinder unit") having a cylinder housing 4 and an actuating piston 5 and at least one pressure chamber which can be connected to a pressure medium 6.

The first cylinder unit 4 of the actuating device 3 is designed such that the pressure plate 12 is pressed against the central plate 10 by the plate spring. The force resulting from this pressing action defines the maximum drive torque that can be transmitted via the component clutch K1. Here, the lever spring tongues of the lever spring 14 are operatively connected to the actuating bearing 16. An outer end of the lever spring 14 is mounted on the cover 15 of the component clutch K1 (also referred to hereinafter as "tension anchor"). A central region of the lever spring 14 is supported on the cover 17 of the component clutch K2.

When the tensile force $F_{K1}$ is generated in the outer cylinder unit 4, 5 (proceeding from the closed basic state of the component clutch K1), the inner end of the lever spring 14 (that is to say the lever spring tongues) and the disengagement bearing 16 are moved to the right in FIG. 1, the lever spring 14 (which may be designed for example as a plate spring) is pivoted about the support 18, the cover 15 is moved to the left in FIG. 1, and the pressure plate 12 of the component clutch K1 is likewise moved to the left in FIG. 1 on account of the action of the leaf spring elements, as a result of which a clamping of the clutch disk 20 is eliminated. The clutch K1 which is closed in the basic state is then opened on account of the tensile force $F_{K1}$.

The actuating device 3 also comprises a second cylinder unit ("inner cylinder unit") which has a cylinder housing 21 and a piston 22 and also at least one pressure chamber which can be connected to a pressure medium.

The second cylinder unit 21 is designed such that a compressor force $F_{K2}$ is generated which is transmitted via the actuating bearing 24 (engagement bearing) to the lever spring 13. The outer region of the lever spring 13 is supported on the cover 17 of the component clutch K2, which cover 17 is supported via the spacers 8 of the screw connections 1 on the central plate 10 and is fastened via the screws 9 of the screw connection 1 to the flywheel disk 11.

As illustrated, the actuating device 3 of the double clutch 1 is designed as a double central engagement/disengagement means with pneumatic or hydraulic actuation. On account of the selected force directions, the actuating threes of the clutch K1 and the actuating forces of the clutch K2 are in opposite directions to one another, such that no axial force is transmitted to the crankshaft.

As is also illustrated, the component clutch K1 is closed in the basic state and must be pulled in order to be opened, and the component clutch K2 is open in the basic state and must be pushed in order to be closed, again such that the actuating forces K1 and K2 act counter to one another and the exertion of an axial force on the crankshaft can be prevented.

The above description discloses inter alia that the two actuating forces of a double clutch, firstly the actuating force of the "normally open" clutch K2 which is pushed closed and secondly the actuating force of the pulled "normally closed" clutch K1, balance out, such that the sum of the two actuating forces is approximately zero, and overdimensioning of the crankshaft bearing or of the transmission bearing is not necessary.

Figure 5:
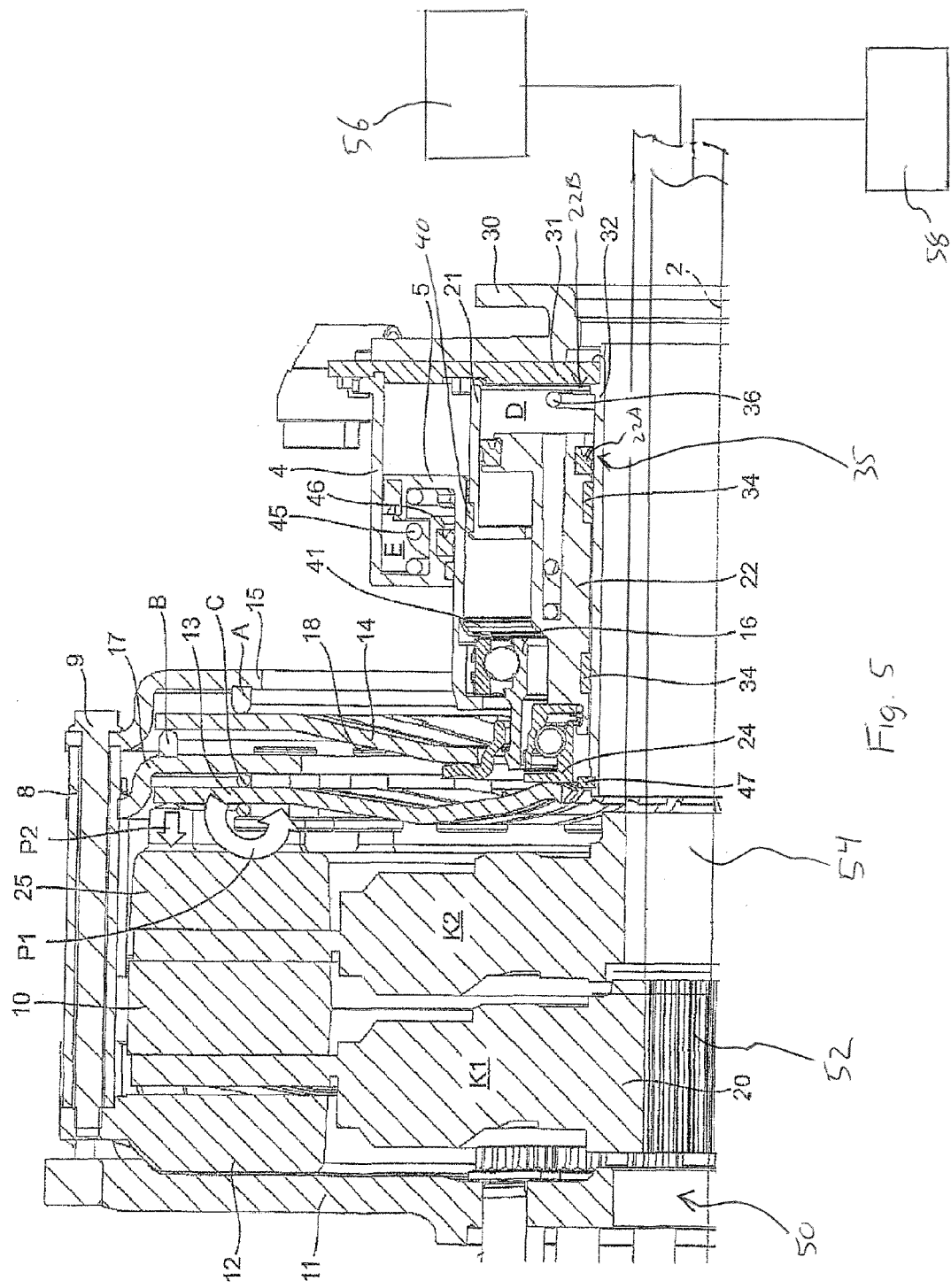
FIG. 5 shows an illustration of the design of a second exemplary embodiment of the double clutch having a component clutch K1, which is open in the basic state and is pulled closed, and a second component clutch K2, which is closed in the basic state and is pushed open, in the new state (that is to say without wear)

As illustrated, the double clutch design according to FIG. 1 comprises a "normally closed" component clutch which is pulled open, and a "normally open" component clutch K2 which is pushed closed. During a gear change (change in transmission ratio stage 56, 58 (See. FIG. 5)), it is assumed that the component clutch K1 is closed and the component clutch K2 is open. The actuating device then need not impart any actuating force at this time. If it is intended to carry out a gear change, then the component clutch K1 must be opened. This is carried out by pulling on the plate spring 14 with the force $F_{K1}$. To simultaneously close the component clutch K2, the lever spring 13 is pushed. The actuating forces are accordingly in opposite directions, and the sum of the two actuating forces is approximately zero. When the actuating forces are no longer exerted, the component clutch K1 closes as a result of its own plate spring force, and the component clutch K2 opens again as a result of its own leaf spring force.

Figure 2:
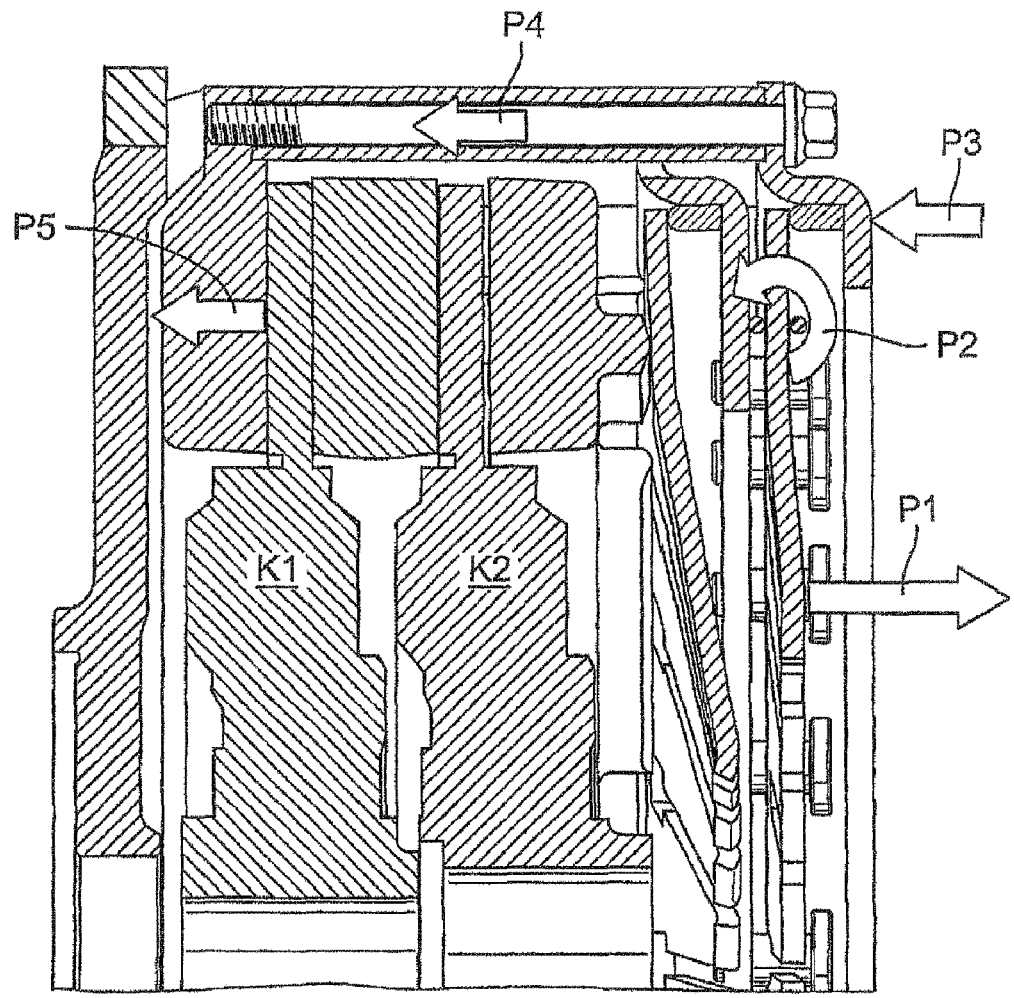
FIG. 2 shows a further illustration of the first exemplary embodiment with movement arrows for indicating the movement of the components during an actuation of the component clutch K1.

Said component movements required for actuating the component clutch K1 are indicated in FIG. 2 by means of the arrows 1 to 5. Here, FIG. 1 shows the movement arrow P1 for the plate spring tongues. The tensile three exerted by the actuating device 3 points in the same direction as the arrow P1. The arrow 2 shows the rotation of the plate spring 14 about its support point. The torque imparted by the actuating device points in the same direction as the arrow P2. Arrow 3 shows the movement of the tension anchor 15 of the component clutch K1. Arrow 4 shows the movement of the screw connections with screws and spacer sleeves between the tension anchor 15 and pressure plate 12 of the component clutch K1. Arrow 5 shows the movement of the pressure plate 12, as a result of which the "normally closed" component clutch K1 is finally pulled open by the force $F_{K1}$.

Figure 3:
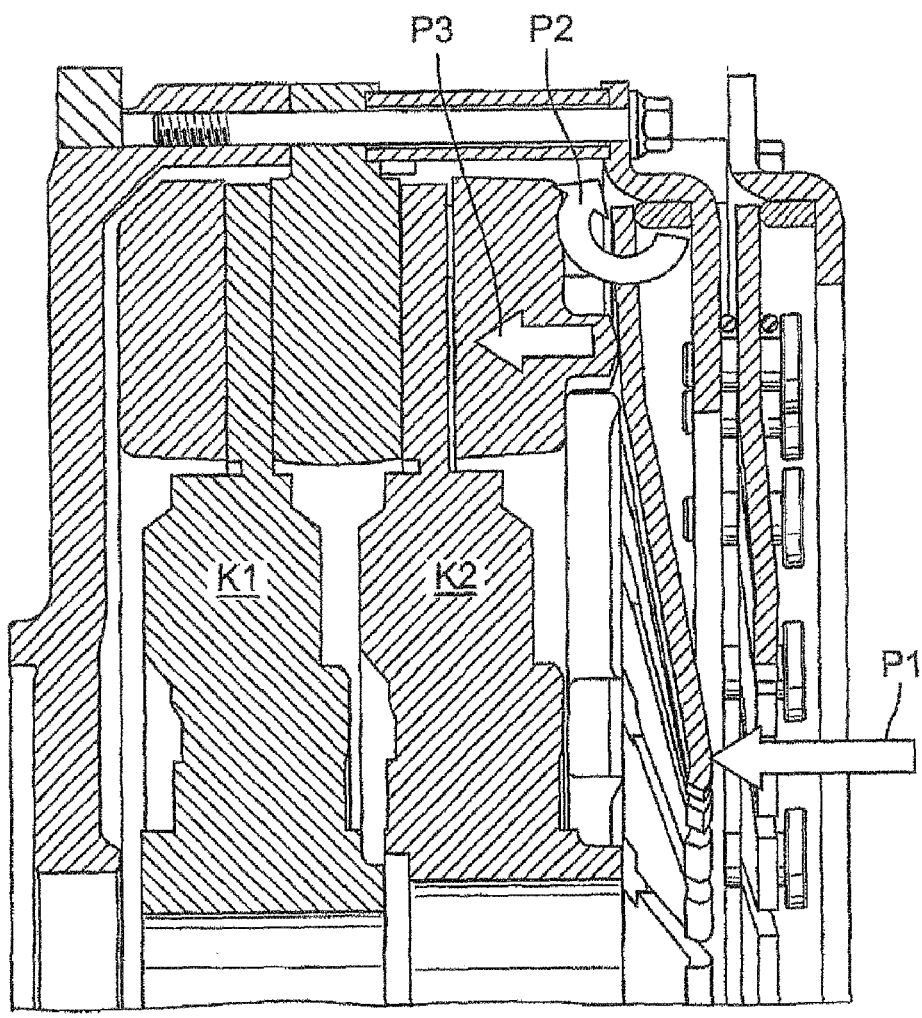
FIG. 3 shows a further illustration of the first exemplary embodiment with movement arrows for indicating the movement of the components during an actuation of the component clutch K2.

FIG. 3 shows the conditions in the double clutch arrangement according to FIG. 1 during an actuation of the component clutch K2. The component movements required for actuating the component clutch K2 are indicated in FIG. 2 by means of the arrows 1 to 3. Here, arrow P1 shows the movement of the lever spring tongues. The pressure force $F_{K2}$ exerted on the lever spring 13 points in the same direction as the arrow 1. Arrow 2 shows the rotation of the lever spring 13 about its support point. The torque imparted by the actuating device points in the same direction as the arrow 2. Arrow 3 shows the movement of the pressure plate 25 of the component clutch K2 for closing the "normally open" component clutch K2.

Figure 4:
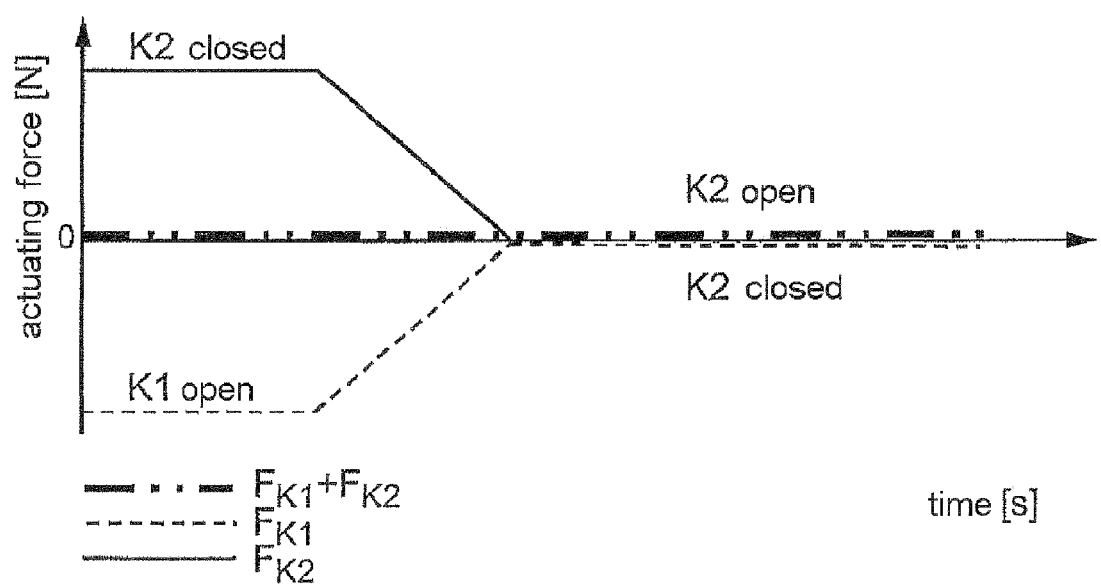
FIG. 4 shows a diagram illustrating the profile of the actuating forces of the component clutches K1 and K2 in the first exemplary embodiment of the present double clutch during an overlapping shift.

FIG. 4 shows the actuating force conditions and the resulting effect on the crankshaft axial force, with the actuating forces $F_{K1}$, $F_{K2}$ and also the resulting actuating force $F_{K1}+F_{K2}$ being illustrated.

In the profile, shown in FIG. 4, of the actuating forces during the overlapping shift, the component clutch K1 is initially open and the component clutch K2 is initially closed, with the actuating forces of the component clutches K1 and K2 being directed counter to one another. The overall actuating force is therefore approximately zero. An overlapping shift is subsequently carried out in order to close the component clutch K1 and open the component clutch K2. Correspondingly, the actuating force of the component clutch K1 increases and the actuating force of the component clutch K2 decreases. The overall actuating force therefore remains substantially equal to zero. In the end state, the component clutch K1 is closed and the component clutch K2 is open.

To open the component clutch K1, it is necessary in this arrangement to pull on the plate spring. To simultaneously close the component clutch K2, the lever spring must be pushed. The actuating forces are thus in opposite directions, and the sum of said two actuating forces is approximately zero. This also has the result that there is no axial action of force on the crankshaft.

The first exemplary embodiment of the double clutch arrangement shown in FIG. 1 can correspondingly achieve the object of the present invention, that of the axial force, for example on the crankshaft, being kept low, because the sum of the two actuating forces, one pushing and at the same time one pulling, is approximately zero.

FIG. 5 shows a second exemplary embodiment of a double clutch arrangement with compensation of the actuating forces (similar to the exemplary embodiment according to FIG. 1), with identical parts of the double clutch arrangement being provided with the same reference symbols, and with said exemplary embodiment being optimized with regard to a certain design of a double clutch transmission. The schematically sketched design of the actuating device 3 in FIG. 1 is also rendered more precisely in FIG. 5.

FIG. 5 thus shows a central guide tube 32 which is indirectly or directly fastened by means of a flange 30 to a transmission housing. By means of the guide tube 32 and flange 30, therefore, the present actuating device 3 is supported on the transmission. Here, the flange and guide tube are plugged one into the other. To connect them, an (interference) fit or a positively locking connection or a cohesive connection may be provided depending on the respective application. As an alternative to a central guide tube, use may also be made of a radially outer tube or a tube situated between the cylinder units. The expression "tube" is to be understood to encompass both circular (annular) cross sections and also other rotationally symmetrical or rotationally asymmetrical cross sections. Rotationally asymmetrical cross sections in particular provide a facility for preventing the pistons from rotating within the cylinders.

The flange 30 and central guide tube 32 have, radially at the inside, an opening through which are guided the transmission input shafts 52, 54 which are arranged coaxially and nested one inside the other. The first component clutch K1 connects the first transmission input shaft 52 to a driveshaft 50 of a drive and the second component clutch K2 connects the second transmission input shaft 54 to the driveshaft 50 of a drive.

A rear wall 31 of the actuating device 3 is supported on the central guide tube 32. Here, the central guide tube has a shoulder region on which the rear wall is supported. To connect them, an (interference) fit or a positively locking connection or a cohesive connection may be provided depending on the respective application. In particular if the flange and guide tube are already fixedly connected to one another, it would also be possible to dispense with a fixed connection between the rear wall and guide tube.

In the present exemplary embodiment according to FIG. 5, the rear wall 31 is fixedly connected to the guide tube 32 and is screwed by means of screw connections to the flange 30, that is to say the rear wall connects the guide tube and flange. The guide tube and rear wall could also be integrated to form a single component which could be produced for example in a deep-drawing process. Between the guide tube/rear wall (regardless of whether these are separate components or an integral component) on the one hand and flange 30 on the other hand, it is also possible to use connecting means other than screws, for example rivets.

The cylinder housing 4 of the outer cylinder unit and the cylinder housing 21 of the inner cylinder unit are fastened to the rear wall 31, with the cylinder housings 4, 21 being arranged so as to be nested one inside the other and coaxially with respect to the axis 2, so as to form an inner cylinder unit with the cylinder housing 21 and an outer cylinder unit with the cylinder housing 4.

Here, screw connections are again provided between the rear wall and cylinder housings, wherein as discussed above, other types of connection are also possible, for example adhesive bonding or riveting or welding or soldering.

The piston 22 of the inner cylinder unit is supported in a longitudinally movable manner on the central guide tube 32 by means of preferably two support points 34. Some other number of support points is also possible.

The piston 22 has, in its central opening 22A, a radial groove in which a scaling ring 35 is held. Said sealing ring 35 is provided for sealing off the gap between the piston 22 of the inner cylinder unit and the guide tube 32. The piston also comprises a recess 22B which runs in the axial direction and in which is held a preload spring 36. Said preload spring 36 is supported in the recess 22B and on the rear wall 31, such that the piston 22 is preloaded in the direction of the actuating bearing 24. By means of said preload, the actuating bearing 24 is pressed against the plate spring of the clutch K2. Furthermore, the ends of the preload spring are arranged such that a rotation-preventing facility is formed in a simple manner. The pressure chamber D of the inner cylinder unit is formed between the actuating piston 22, the cylinder housing 21, the rear wall 31 and the guide tube 32. A supply of pressure medium takes place preferably via the rear wall 31.

The cylinder housing of the inner cylinder unit comprises a cylindrical region aligned in the axial direction. A guide 40 is arranged on the outer lateral surface of said cylindrical region. The movement piston 5 of the outer cylinder unit is supported on said guide 40, which in the present case is of spherical design. As a result, the piston of the outer cylinder unit is tiltable to a certain extent. Some other number of support points is also possible.

Here, the actuating piston 5 of the outer cylinder unit is connected to the actuating bearing 16 by virtue of the actuating bearing 16 being preloaded with its outer running ring against the actuating piston 5 by means of the spring element 41.

The actuating piston 5 of the outer cylinder unit forms, with the cylinder housing 4 of the outer cylinder unit (that is to say without the rear wall 31), a pressure chamber E for the outer cylinder unit. Said pressure chamber E is sealed off by means of the sealing rings. The pressure medium inflow takes place via the connecting point 44, which attaches directly to the cylinder housing 4.

A preload spring 45 is held in the pressure chamber E of the outer cylinder unit. By means of said preload spring 45, which is arranged between the cylinder housing 4 and movement piston 5 of the outer cylinder unit, the actuating bearing 16 is preloaded in the axial direction toward the transmission, such that the actuating bearing 16 is pushed into contact with the plate spring of the component clutch K1.

A further support point is arranged in the engine-side end region of the cylinder housing 4 of the outer cylinder unit, on which further support point the actuating piston 5 of the outer cylinder unit is supported additionally to the first, spherical support point.

As explained, the pistons 5 and 22 are arranged so as to be axially movable. A maximum movement travel of the movement piston 22 of the inner cylinder unit is limited by means of the stop 47. A maximum movement path of the movement piston 5 of the outer cylinder unit is limited by means of the stop 46.

In the double clutch arrangement according to FIG. 5, the drive-side component clutch K1 is open in the basic state ("normally open") and is pulled closed when actuated. The transmission-side component clutch K2 is closed in the basic state and is pushed open by the actuating device. The plate spring moment is illustrated in FIG. 5 by the arrow P1 about the support point C of the plate spring. The force generated on account of said moment is illustrated by the arrow 2. The force generated by the plate spring corresponds to the pressing force of the transmission-side component clutch K2 which is closed in the basic state (minus the force generated by the leaf spring packs arranged between the central plate 10 and the pressure plate 25).

Here, FIG. 5 shows the new state of the clutch. This can be seen from the position of the actuating piston 22 of the inner cylinder unit and the position of the actuating position 5 of the outer cylinder unit. Here, the actuating piston 22 of the inner cylinder unit is shown approximately in the middle of the maximum axial movement travel of said piston. By applying a pressure force via the pressure chamber D, the piston can be moved further to the left in FIG. 5. In this way, the pressure force is exerted on the plate spring 13, by means of which the transmission-side component clutch K2 is pushed open counter to the plate spring moment P1 shown in FIG. 5. The pressing force P2 of the component clutch K2 is correspondingly reduced. If the pressing force P2 of the component clutch K2 is lower than the force of the leaf spring packs between the central plate and pressure plate 25 and the elastic forces in the clutch disk lining, then the torque that can be transmitted via the component clutch K2 is reduced to zero.

As stated, the actuating piston 22 is shown in a middle position, such that an actuating travel to the right in FIG. 5 is also provided which is kept as a wear adjustment reserve, as will be explained below.

The actuating piston 5 is illustrated in its forward end position assumed on account of the force equilibrium between the preload spring 45 and leaf spring pack between the pressure plate 10 and pressure plate 12, or by means of the stop 46.

When the outer cylinder unit is actuated, the pressure in the actuating chamber E is increased, as a result of which the actuating piston 5 is moved to the right in FIG. 5, a tensile force is exerted on the lever spring 14 and, on account of the support points A and B, the tension anchor 15 is moved to the right and therefore the pressure plate 12 is also moved to the right in FIG. 5, and the component clutch K1 is thus pulled closed. A wear reserve is also provided in the outer cylinder unit, said wear reserve however being provided together with the actuating travel to the right of the actuating piston 5 in FIG. 5.

Figure 6:
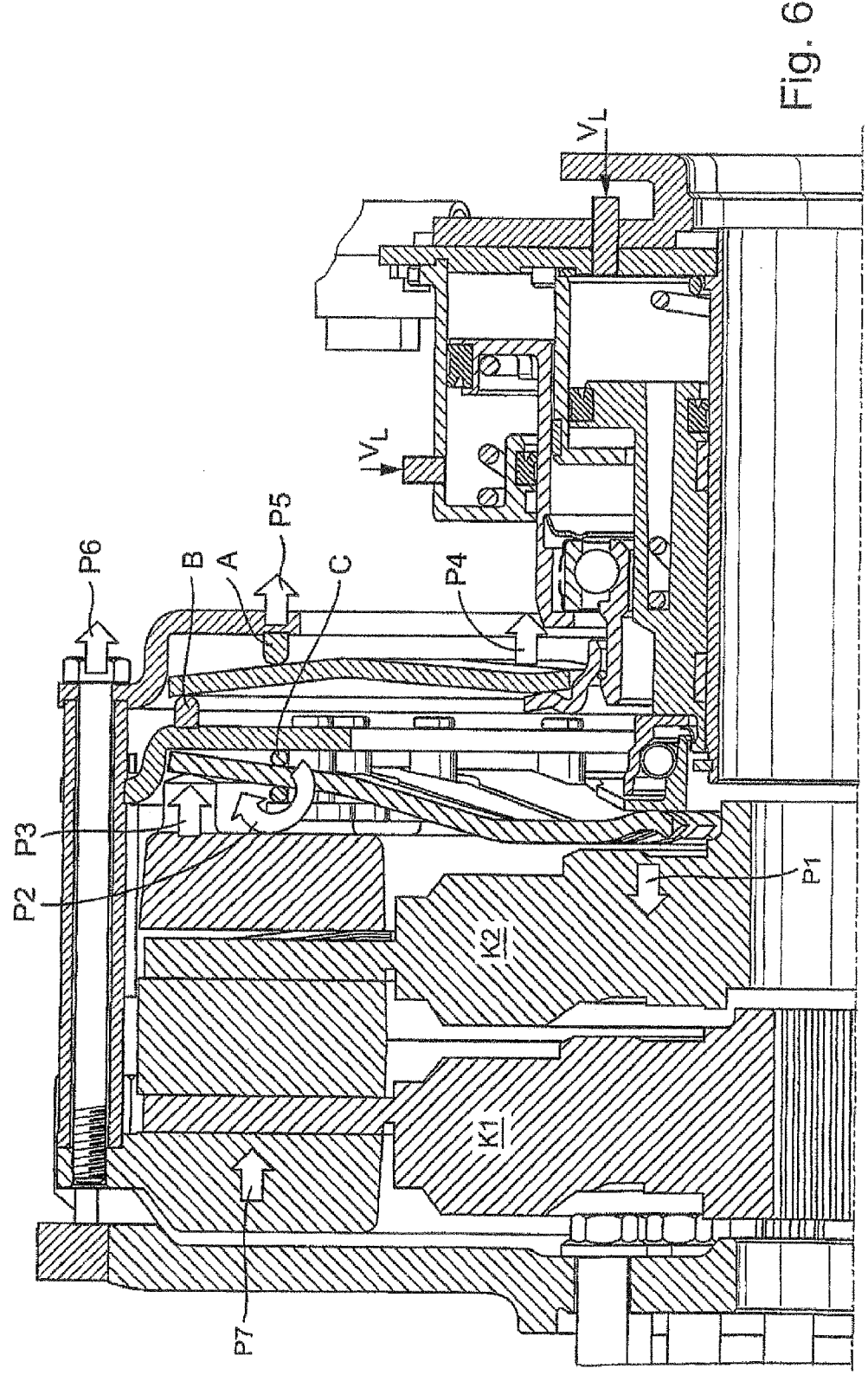
FIG. 6 shows a further illustration of the second exemplary embodiment with the component clutch K1 closed (that is to say actuated) and the component clutch K2 open (that is to say actuated) in the new state, with movement arrows for indicating the movement of the components during the actuation of the component clutches K1 and K2.

The conditions during the actuation of the double clutch arrangement according to FIG. 5 are shown in FIG. 6. Here, the arrow P1 shows the pressure force generated by the actuating device, arrow P2 shows the moment generated about the support point C, arrow P3 shows the movement generated at the outer end of the plate spring, on account of which the pressure plate of the component clutch K2 is raised up and releases the corresponding clutch disk of the component clutch K2. Arrow P4 shows the tensile force generated at the lever spring, arrow P5 shows the movement of the tension anchor generated at the support point A of the tension anchor in conjunction with the support point B on the clutch cover of the component clutch K2, arrow P6 shows the movement, resulting from the movement of the tension anchor, of the screw connection between the tension anchor and pressure plate of the component clutch K2, and arrow P7 shows the resulting movement of the component clutch K1, or the force on the component clutch K1 as a result of the movement.

Correspondingly, the actuating piston 5 in FIG. 6 is moved to the right, and the actuating piston 22 in FIG. 6 is moved to the left, in relation to the illustration of FIG. 5. FIG. 6 therefore shows the clutch in the new state with the component clutch K1 closed and component clutch K2 open.

Figure 7:
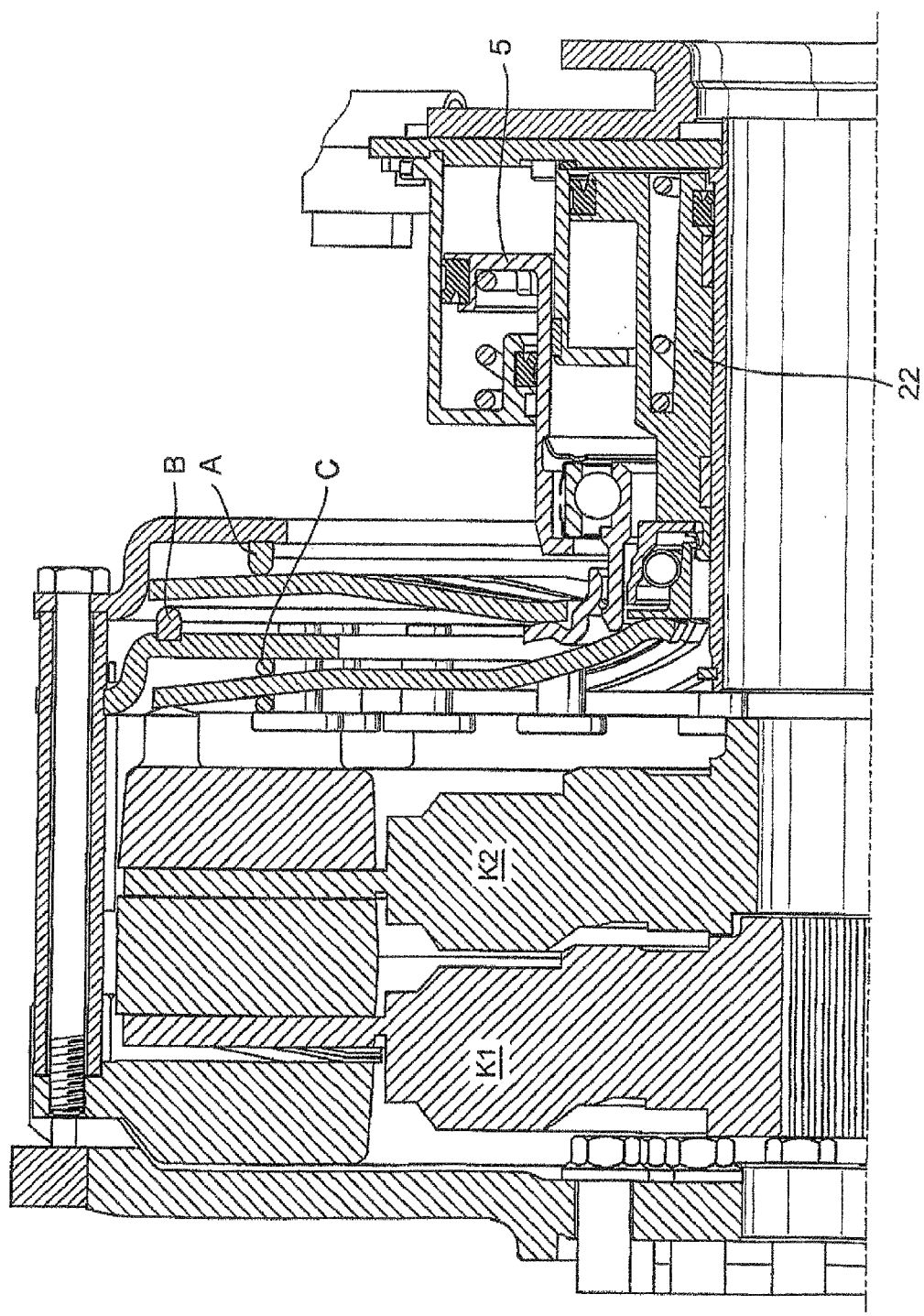
FIG. 7 shows a further illustration of the second exemplary embodiment in the worn state with the component clutch K1 open and the component clutch K2 closed (that is to say both component clutches in the basic state)

FIG. 7 shows the double clutch arrangement according to FIGS. 5 and 6 not in the new state but rather in the worn state, specifically with the component clutch K1 open and the component clutch K2 (that is to say in the state in which the actuating device 3 is not imparting an actuating force). Here, in FIG. 7, the actuating piston 22 is illustrated at the end of the maximum wear travel, as can be seen from a comparison with the illustration of FIG. 5, because the movement piston 22 has arrived in its end position in the direction of the transmission. In FIG. 7, the actuating piston 5 has also moved further to the right, proceeding from its initial position in FIG. 5, on account of wear.

On account of the wear states shown in FIG. 7, it can be seen that wear reserve travels are provided as part of the maximum possible movement travels of the actuating pistons. The actuating device is correspondingly capable of compensating for the wear without the need for a separate mechanical wear adjusting device to be provided. This type of wear compensation can be used both for the double clutch concept according to FIG. 5 and also for the double clutch concept according to FIG. 1 and also for other double clutch concepts. This concept is therefore not restricted to the double clutch arrangements shown in the present application, even though it can be used particularly advantageously in conjunction therewith.

FIG. 8, too, shows the double clutch in the worn state, with the component clutch K1 being closed and the component clutch K2 being open (that is to say in the actuated state of the second exemplary embodiment). Correspondingly, the required actuating travel is added to the wear in the outer cylinder unit, as a result of which the movement piston 5 has been moved yet further to the right in relation to FIG. 7. The movement piston 5 can thus reach its right-hand end position in the actuated state when the wear reserve is fully exhausted.

In FIG. 8, arrow P1 again shows the movement of the plate spring on account of the pressure force exerted by the actuating device, arrow P2 shows the moment about the support point C, and arrow P3 shows the movement of the pressure plate. Arrow P4 shows the movement of the lever spring tongues on account of the tensile force $F_{K1}$ on the lever spring 14. Arrow P5 shows the movement of the tension anchor 15, arrow P6 shows the movement of the screw connections between the tension anchor and pressure plate 12 of the component clutch, and arrow P7 shows the movement of the pressure plate 12 and the resulting pressing force for closing the component clutch K1.

The design of the double clutch according to FIGS. 5 to 8 is provided in particular for double clutch transmissions in which the most-used transmission ratio stage is in that component transmission which is connected to the component clutch K2 which is closed in the basic state. If the most-used gear is connected to the component clutch K2 which is closed in the basic state, then no actuating force need be imparted by the actuating device during operation in the most-used transmission ratio stage, as a result of which the energy efficiency of the double clutch arrangement and/or of the double clutch transmission is increased.

The most-used gear of a vehicle is conventionally the highest gear; this is true specifically in the case of utility vehicles. The vehicle (the utility vehicle) can therefore be moved in the highest gear without an actuating force being imparted by means of the actuating device of the double clutch.

Applied to the double clutch according to FIG. 1, this means that a double clutch arrangement according to FIG. 1 can be used in a particularly energy-efficient manner if the component clutch K1 which is closed in the basic state is connected to that component transmission which has the most-used gear, or specifically for utility vehicles, the highest gear.

The increase in efficiency is therefore obtained with the double clutch design according to FIG. 1 and with the double clutch design according to FIG. 5 depending on which component transmission of the double clutch transmission the most-used transmission ratio stage is arranged in.

From the above description of the second exemplary embodiment, it emerges that the two actuating forces of a double clutch, firstly of the pushed-open "normally closed" clutch K2 and secondly of the "normally open" clutch K1, balance out, and consequently the sum of the two actuating forces is approximately zero, such that no overdimensioning of the crankshaft bearing or of the transmission bearing is required. The exemplary embodiments also show that the clutch K2 is "normally closed" in order that, with the conventional design of a double clutch transmission, the highest gear (the gear which is used most) requires no energy supply in the cylinder during operation (energy saving). At the same time, the above description presents a double CPCA which can pull and push. This also applies equally to the exemplary embodiment according to FIG. 1, with the component clutch K1 then being connected to the highest gear (the gear which is used most).

LIST OF REFERENCE SYMBOLS

1 Double clutch
2 Axis
3 Actuating device
4 Cylinder housing/unit
5 Movement piston
8 Spacer
9 Screws
10 Intermediate plate
11 Flywheel disk
12 Pressure plate
13 Lever spring
14 Plate spring
15 Clutch cover (tension anchor)
16 Actuating bearing
21 Cylinder housing
22 Piston
22A Opening
22B Recess
24 Actuating bearing
25 Pressure plate
30 Flange
31 Rear wall
32 Guide tube
33 Region
34 Support shafts
40 Guide
41 Spring element
50 Driveshaft
52 First Transmission Shaft
54 Second Transmission Shaft
56 First Group of Transmission Ratio Stages
58 Second Group of Transmission Ratio Stages
$F_{K1}$ Force
$F_{K2}$ Pressure force
I Screw connection
II Screw connection

The invention claimed is:

1. A double clutch, comprising:
a first component clutch by which a driveshaft of a drive is connectable to a first transmission input shaft of a transmission;
a second component clutch by which the driveshaft of the drive is connectable to a second transmission input shaft of the transmission;
a first lever,
a second lever; and
an actuating device,
wherein the first component clutch is open in a non-actuated state and the actuating device generates a tensile actuating force at an inner periphery of the first lever that is applied in a first direction so as to pull the first component clutch to a closed position, and the second component clutch is closed in a non-actuated state and the actuating device generates a pressure actuating force at an inner periphery of the second lever that is applied in a second direction so as to push the second component clutch to an open position, such that the tensile actuating force of the first component clutch, which is pulled in the first direction acts counter to the pressure actuating force of the second component clutch, which is pushed in the second direction.

2. The double clutch as claimed in claim 1, wherein one of the component clutches has a first actuating bearing and another of the component clutches has a second actuating bearing, the actuating device having a first pneumatically or hydraulically actuable cylinder unit, which has a cylinder housing and a piston, for pulling the first actuating bearing of the one of the component clutches, the actuating device further having a second pneumatically or hydraulically actuable cylinder unit, with a cylinder housing and a piston, for pushing the second actuating bearing of the another component clutch.

3. The double clutch as claimed in claim 2, further comprising:
a flywheel disk with or without vibration damping, which flywheel disk is fixedly connected to the driveshaft of the drive; and
a central plate,
the component clutches having pressure plates and the central plate acting as a counterpressure plate for the pressure plates of the component clutches, the central plate being fixed to the flywheel disk and the double clutch being mounted exclusively by fastening of the flywheel disk to the driveshaft.

4. The double clutch as claimed in claim 3, wherein the second component clutch has a clutch cover, the clutch cover of the second component clutch being fixed to the central plate.

5. The double clutch as claimed claim 2, wherein the first cylinder unit, which generates a tensile force, interacts via the first actuating bearing with the first component clutch which is pulled closed and which is open in a normal state, and the second cylinder unit, which generates a pressure force, interacts via the second actuating bearing with the second component clutch which is pushed open and which is closed in the normal state.

6. The double clutch as claimed in claim 5, wherein the first cylinder unit and the second cylinder unit are nested one inside another and are arranged symmetrically with respect to an axis of the transmission input shafts and of the crankshaft, such that the first cylinder unit and the second cylinder unit form an inner cylinder unit and an outer cylinder unit in relation to the axis, with the outer cylinder unit being the first cylinder unit which generates a tensile force, and the inner cylinder unit being the second cylinder unit which generates a pressure force.

7. The double clutch as claimed in claim 6, further comprising a central guide tube which is supported on the transmission, with the piston of the inner cylinder unit being movably supported on the central guide tube, and with the piston of the outer cylinder unit being movably supported on the cylinder housing of the inner cylinder unit.

8. The double clutch as claimed in claim 7, wherein the cylinder housing of the inner cylinder unit and/or the cylinder housing of the outer cylinder unit are/is fastened to a rear wall supported on the central guide tube of the actuating device.

9. The double clutch as claimed in claim 8, wherein the inner cylindrical unit has a preload spring arranged between the rear wall and the piston of the inner cylinder unit, by which preload spring the piston is pushed in a direction of the actuating bearing of the another of the component clutches, with a pressure chamber of the inner cylinder unit being formed by the piston and cylinder housing of the inner cylinder unit and by the rear wall.

10. The double clutch as claimed in claim 8, wherein the outer cylinder unit has a preload spring arranged between the cylinder housing and the piston of the outer cylinder unit, a pressure chamber of the outer cylinder unit being formed exclusively by the cylinder housing and the piston of the outer cylinder unit.

11. A double clutch transmission, comprising:
   a first transmission input shaft having a first group of transmission ratio stages assigned to the first transmission input shaft; and
   a second transmission input shaft having a second group of transmission ratio stages assigned to the second transmission input shaft,
   the transmission input shafts being connectable to a driveshaft of a drive by a double clutch comprising a first component clutch by which the driveshaft of the drive is connectable to the first transmission input shaft of the transmission, a second component clutch by which the driveshaft of the drive is connectable to the second transmission input shaft of the transmission, a first lever, a second lever and an actuating device,
   wherein the first component clutch is open in a non-actuated state and the actuating device generates a tensile actuating force that is applied at an inner periphery of the first lever in a first direction so as to pull the first component clutch, and the second component clutch is closed in a non-actuated state and the actuating device generates a pressure actuating force that is applied at an inner periphery of the second lever in a second direction so as to push the second component clutch to an open position, such that the tensile actuating force of the first component clutch, which is pulled in the first direction, acts counter to the pressure actuating force of the second component clutch, which is pushed in the second direction, the first transmission input shaft being connectable to the driveshaft by the first component clutch and the second transmission input shaft being connectable to the driveshaft by the second component clutch.

12. The double clutch transmission as claimed in claim 11, wherein a highest of the transmission ratio stages is assigned, as the transmission stage which is used most during operation of the double clutch transmission, to the second transmission input shaft and to the second component clutch.

* * * * *